(12) United States Patent
Sekine

(10) Patent No.: US 7,630,542 B2
(45) Date of Patent: Dec. 8, 2009

(54) COLOR PROCESSING METHOD AND APPARATUS

(75) Inventor: Hisato Sekine, Yokohama (JP)

(73) Assignee: Canon Kabushiki Kaisha, Toyko (JP)

( * ) Notice: Subject to any disclaimer, the term of this patent is extended or adjusted under 35 U.S.C. 154(b) by 680 days.

(21) Appl. No.: 11/547,035

(22) PCT Filed: Apr. 7, 2006

(86) PCT No.: PCT/JP2006/307874

§ 371 (c)(1), (2), (4) Date: Oct. 3, 2006

(87) PCT Pub. No.: WO2006/109859

PCT Pub. Date: Oct. 19, 2006

(65) Prior Publication Data

US 2007/0223810 A1 Sep. 27, 2007

(30) Foreign Application Priority Data

Apr. 13, 2005 (JP) .............................. 2005-115909

(51) Int. Cl.
*G06K 9/00* (2006.01)
(52) U.S. Cl. ...................................... 382/162; 382/167
(58) Field of Classification Search ................. 382/162, 382/167, 117, 133, 159, 171; 340/5.53; 706/12, 706/16, 20, 25; 345/589, 690; 707/6; 700/303; 356/402, 419; 348/210.99
See application file for complete search history.

(56) References Cited

U.S. PATENT DOCUMENTS

| | | | | |
|---|---|---|---|---|
| 6,907,412 B2 * | 6/2005 | Pao et al. | ....................... | 706/16 |
| 6,927,855 B2 * | 8/2005 | Wilsher et al. | .............. | 356/402 |
| 6,941,287 B1 * | 9/2005 | Vaidyanathan et al. | ......... | 706/12 |
| 6,959,109 B2 * | 10/2005 | Moustafa | .................... | 382/159 |
| 7,444,308 B2 * | 10/2008 | Guyon et al. | .................. | 706/12 |
| 7,542,947 B2 * | 6/2009 | Guyon et al. | .................. | 706/12 |

FOREIGN PATENT DOCUMENTS

| | | |
|---|---|---|
| JP | 11-275376 | 10/1999 |
| JP | 2000-287096 | 10/2000 |
| JP | 2001-054131 | 2/2001 |
| JP | 2001-086383 | 3/2001 |
| JP | 2002-254708 | 9/2002 |
| JP | 2002-340677 | 11/2002 |

* cited by examiner

*Primary Examiner*—Anh Hong Do
(74) *Attorney, Agent, or Firm*—Fitzpatrick, Cella, Harper & Scinto

(57) ABSTRACT

Principal component data of a plurality of dimensions representing colors are input. Principal component data of each of the plurality of dimensions is changed using a weight corresponding to the contribution of the principal component data of each dimension so as to map, in the color reproduction range of a device, the colors represented by the input principal component data of the plurality of dimensions. The weight of the principal component data of each dimension decreases as the contribution decreases.

7 Claims, 14 Drawing Sheets

FIG. 6

| OUTPUT SIGNAL VALUE | | | | | | | PRINCIPAL COMPONENT COEFFICIENT | | | | | |
|---|---|---|---|---|---|---|---|---|---|---|---|---|
| C | M | Y | K | R | G | | 1 | 2 | 3 | 4 | 5 | 6 |
| 0 | 0 | 0 | 0 | 0 | 0 | | 3.303 | -2.62 | 1.116 | -0.33 | 0.3 | -0.03 |
| 0 | 0 | 0 | 0 | 0 | 64 | | 2.773 | -2 | 0.35 | -0.07 | 0 | 0.025 |
| 0 | 0 | 0 | 0 | 0 | 128 | | 2.143 | -1.43 | -0.26 | 0.147 | -0.23 | 0.022 |
| 0 | 0 | 0 | 0 | 0 | 192 | | 1.34 | -1.02 | -0.56 | 0.264 | -0.31 | -0.09 |
| 0 | 0 | 0 | 0 | 0 | 255 | | 0.136 | -0.69 | -0.48 | 0.192 | -0.2 | -0.26 |
| 0 | 0 | 0 | 0 | 64 | 0 | | 3.124 | -1.87 | 0.569 | -0.42 | 0.325 | -0.05 |
| 0 | 0 | 0 | 0 | 64 | 64 | | 2.677 | -1.47 | 0.103 | -0.18 | 0.137 | -0.01 |
| 0 | 0 | 0 | 0 | 64 | 128 | | 2.075 | -1.04 | -0.32 | 0.062 | -0.02 | -0.01 |
| 0 | 0 | 0 | 0 | 64 | 192 | | 1.311 | -0.71 | -0.53 | 0.214 | -0.09 | -0.08 |
| 0 | 0 | 0 | 0 | 64 | 255 | | 0.14 | -0.49 | -0.43 | 0.183 | -0.06 | -0.21 |

...

COLOR PROCESSING METHOD AND APPARATUS

TECHNICAL FIELD

The present invention relates to a color processing method and apparatus which receive spectral reflection factor data acquired by an input device as an input signal by the color processing apparatus, and convert the input signal into an output signal of an output device.

BACKGROUND ART

Conventionally, when the color of image data acquired by an input device is faithfully reproduced by an output device, colorimetric color reproduction is executed to make input tristimulus values coincide with output tristimulus values using metamerism on the basis of the three color theory. Examples of the input device are a digital camera and scanner. Examples of the output device are a display, projector, and printer.

Generally as a space which quantifies tristimulus values, the CIE-XYZ colorimetric system and CIE-Lab colorimetric system which are defined by the CIE (International Commission on Illumination) are adopted. FIG. 13 shows the flow of a general colorimetric color reproduction system.

As shown in FIG. 13, an image acquired by an RGB input device such as a digital camera is processed in the XYZ color space or L*a*b* color space which is device-independent, and the processed data is output from an RGB (CMY) output device such as a display or printer. However, the XYZ values and L*a*b* values are influenced by the illumination light source. Even if the XYZ tristimulus values or L*a*b* values of an original color and the reproduced color coincide with each other under a given illumination light source, these values may become quite different from each other under another illumination light source. That is, the original color and reproduced color may be perceived to be different from each other.

In the field of color management and the like, implementation of spectral color reproduction is desired as a more faithful color reproduction method. In spectral color reproduction, the spectral reflection factor of an object that does not contain any illuminance light source is reproduced as color information. For this reason, the reproduced color coincides with the original color even under an arbitrary illuminance light source.

As a technique of implementing the spectral color reproduction, a multi-band input/output technique is expected to be promising. Colorimetric color reproduction is color reproduction based on three primary colors such as R, G, and B, or C, M, and Y, whereas the multi-band input/output technique is a technique of acquiring color information of an object using four or more primary colors and reproducing the spectral reflection factor. As an input device, a multi-band camera having four or more bands has been developed (Japanese Patent Laid-Open No. 2001-086383). As an output device, a multi-band output device has also been developed by developing a multi-primary color projector and the like and putting a multi-primary color printer into practical use (Japanese Patent Laid-Open No. 2001-054131).

FIG. 14 shows the flow of a spectral color reproduction system using a multi-band color input/output device.

As shown in FIG. 14, in the spectral color reproduction system, a spectral image having a spectral reflection factor at each pixel is acquired from an object by a multi-band input device. In the spectral space independent of a device and illuminance light source, the image is saved, processed, and transmitted. Finally, the spectral image is reproduced by a multi-band output device.

In the colorimetric color reproduction system, when a color outside the color gamut of an output device is input via an input device, it must be reproduced with a color falling within the color gamut of the output device (this processing will be called mapping hereinafter). Many proposals of the mapping technique have been made in the colorimetric color reproduction system.

For example, Japanese Patent Laid-Open No. 2000-287096 proposes mapping into the color space of a monitor serving as an input color space and into the output color space of a color printer. In Japanese Patent Laid-Open No. 2000-287096, colors displayed on the monitor are converted into a three-dimensional color space of lightness (L), color saturation (C), and hue (H). The lightness of the monitor is compressed into the lightness range of the printer, and colors are mapped at minimum points in the LC space for each hue.

In the spectral color reproduction system, even if the spectral reflection factor is sampled at an interval of 10 nm in a visible light region of 380 nm to 730 nm, this results in data of 36 dimensions for one color, and the data amount to be processed becomes very large. In order to completely reproduce and output the spectral reflection factor of an input, all data of 36 dimensions must be equal to each other. In practice, except for special circumstances, it is very difficult to equally reproduce all data of 36 dimensions. That is, processing for data of 36 dimensions targets colors outside the color gamut of the output device. It is, therefore, a task of the spectral color reproduction system to reduce the data amount and map a color to one having a similar spectral reflection factor.

In order to achieve this task, there is known a method of reducing the data amount of the spectral reflection factor and processing data in a multi-dimensional space of principal component coefficients. According to this method, spectral reflection factor data generally undergoes principal component analysis, and the spectral reflection factor data is expressed by principal component vectors and their addition ratio (to be referred to as a principal component coefficient). In this case, mapping processing in the colorimetric color reproduction system can be applied to the multi-dimensional space of principal component coefficients. Japanese Patent Laid-Open No. 2002-254708 discloses a technique of changing the principal component coefficient of each dimensional number at equal intervals in the principal component coefficient space. According to this technique, a so-called Look-Up-Table (to be referred to as an LUT hereinafter) is created from corresponding output signal values as a conversion table for converting a principal component coefficient into an output signal value. A principal component coefficient is input and converted into a corresponding output signal value to output the signal value.

A case wherein mapping processing in the three-dimensional space used in colorimetric color reproduction as described in Japanese Patent Laid-Open No. 2000-287096 is expanded to n dimensions (n>3) of the principal component coefficient space will be considered. In this case, the three-dimensional color space used in colorimetric color reproduction is a uniform color space. To the contrary, in the principal component coefficient space, contributions exist in respective dimensions, as shown in FIG. 4, and the information amounts in these dimensions are different from each other. For this reason, no high-precision mapping is achieved by simply applying the mapping method in colorimetric color reproduction.

In Japanese Patent Laid-Open No. 2002-254708, a long time is taken to create an LUT because all output signal values must be searched for output signal values corresponding to principal component coefficients arranged at equal intervals, in order to create an LUT. This reference does not specify how to process a color when a color outside the output color gamut is input.

DISCLOSURE OF INVENTION

The present invention has been made to overcome the conventional drawbacks, and has as its object to provide a color processing method and apparatus capable of efficiently reproducing, from an input signal value, an output signal value in the color gamut of an output device at high precision.

According to the present invention, the foregoing object is attained by providing a color processing method comprising:

inputting principal component data of a plurality of dimensions representing colors; and changing principal component data of each of the plurality of dimensions by using a weight corresponding to a contribution of the principal component data of each dimension so as to map, in a color reproduction range of a device, the colors represented by the input principal component data of the plurality of dimensions, wherein the weight of the principal component data of each dimension decreases as the contribution decreases.

In a preferred embodiment, the method further comprises:

holding a conversion table representing correspondences between the principal component data of the plurality of dimensions and device data; and determining, using the conversion table, whether the principal component data of the plurality of dimensions fall within the color reproduction range of the device.

In a preferred embodiment, the method further comprises:

inputting spectral reflection factors of a plurality of colors: and performing principal component analysis for the spectral reflection factors of the plurality of colors to obtain principal component vectors and contributions, wherein the principal component data of the plurality of dimensions are generated from the spectral reflection factors representing colors on the basis of the principal component vectors.

In a preferred embodiment, the weight of the principal component data of each of the plurality of dimensions corresponds to a maximum value and minimum value of the principal component data of each dimension.

In a preferred embodiment, the method further comprises:

obtaining a first spectral reflection factor from mapped principal component data of the plurality of dimensions; and displaying an error between the first spectral reflection factor and a second spectral reflection factor corresponding to the input principal component data of the plurality of dimensions.

According to the present invention, the foregoing object is attained by providing a color processing apparatus comprising:

input means for inputting principal component data of a plurality of dimensions representing colors; and change means for changing principal component data of each of the plurality of dimensions by using a weight corresponding to a contribution of the principal component data of each dimension so as to map, in a color reproduction range of a device, the colors represented by the input principal component data of the plurality of dimensions, wherein the weight of the principal component data of each dimension decreases as the contribution decreases.

The present invention can provide a color processing method and apparatus capable of efficiently reproducing, from an input signal value, an output signal value in the color gamut of an output device at high precision.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention, and together with the description, serve to explain the principles of the invention.

FIG. 6 is a table showing an example of the format of color gamut data according to the first embodiment of the present invention;

BEST MODE FOR CARRYING OUT THE INVENTION

Preferred embodiments of the present invention will be described in detail in accordance with the accompanying drawings.

First Embodiment

An example of the configuration of a spectral color reproduction apparatus according to the first embodiment of the present invention will be described in detail with reference to the accompanying drawings.

Figure 1:
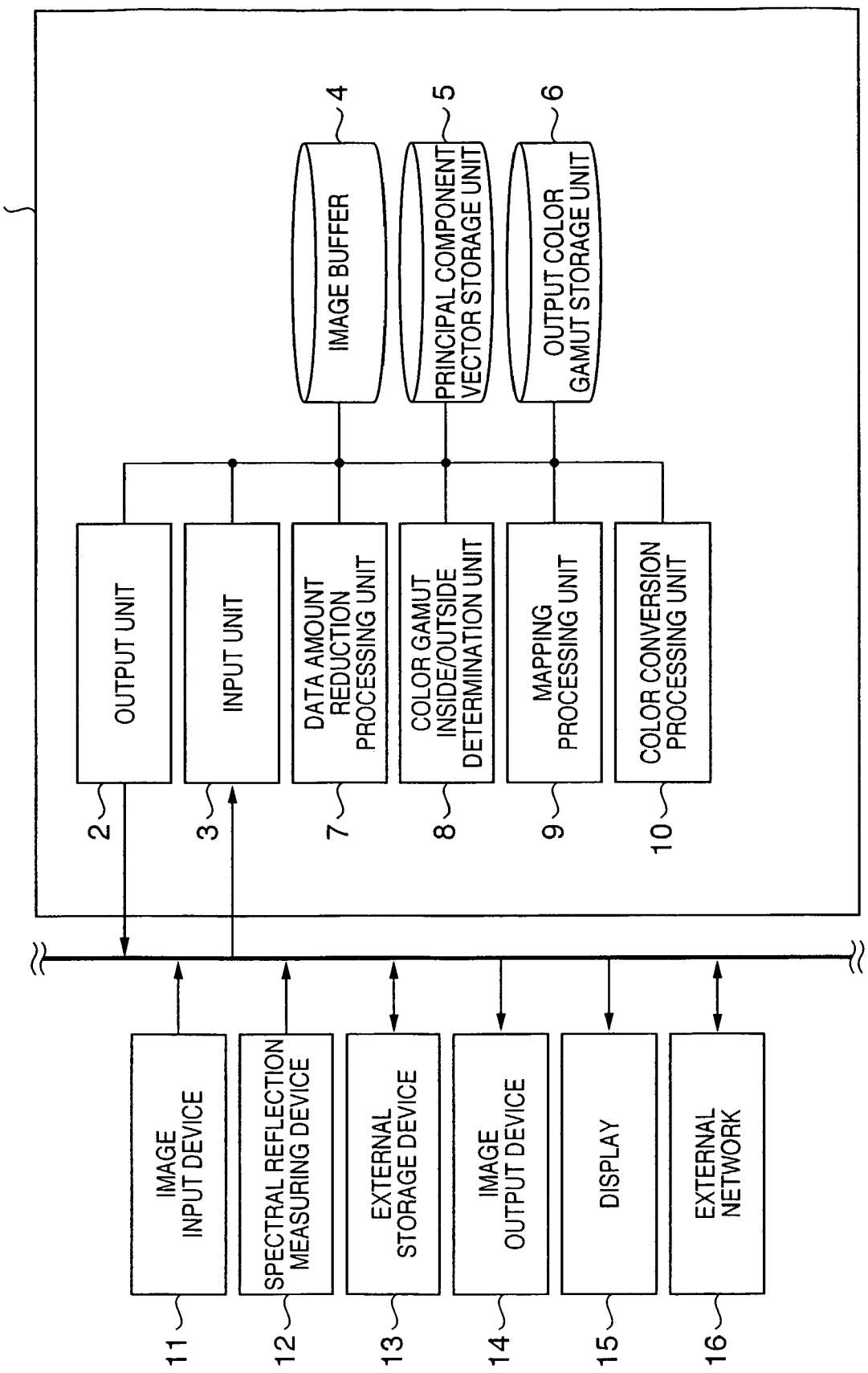
FIG. 1 is a block diagram showing a spectral color reproduction apparatus according to the first embodiment of the present invention.

FIG. 1 is a block diagram showing the configuration of a system having the spectral color reproduction apparatus according to the first embodiment of the present invention.

Reference numeral 1 denotes a spectral color reproduction apparatus according to the first embodiment. Reference numeral 2 denotes an output unit which outputs processed image data. Reference numeral 3 denotes an input unit which receives various data such as spectral data, spectral image data, principal component vector data, and spectral reflection factor data of the output color gamut. Reference numeral 4 denotes an image buffer which stores input image data and image data during processing.

Reference numeral 5 denotes a principal component vector storage unit which stores a principal component vector. Reference numeral 6 denotes an output color gamut storage unit which stores output color gamut data of an output device (e.g., an image output device 14 or display 15). Reference numeral 7 denotes a data amount reduction processing unit which reduces the data amount of spectral image data stored in the image buffer 4 by using a principal component vector stored in the principal component vector storage unit 5.

Reference numeral 8 denotes a color gamut inside/outside determination unit which determines whether each pixel of image data which is stored in the image buffer 4 and whose data amount is reduced falls inside or outside (outside the color reproduction range) the output color gamut data stored in the output color gamut storage unit 6. Reference numeral 9 denotes a mapping processing unit which maps a color outside the output color gamut into the output color gamut. Reference numeral 10 denotes a color conversion processing unit which converts image data (input signal value) stored in the image buffer 4 into an output signal value.

Reference numeral 11 denotes an image input device such as a multi-band camera. Reference numeral 12 denotes a spectral reflection measuring device. Reference numeral 13 denotes an external storage device which is implemented by a hard disk, CD-ROM. DVD-ROM, or the like. The image output device 14 is, e.g., a printer. As the printing method of the printer, for example, an inkjet method, laser beam method, and thermal transfer-method are available. The display 15 is, e.g., a CRT or LCD. Reference numeral 16 denotes an external network.

Note that the spectral color reproduction apparatus 1 has standard building components which are mounted in a general-purpose computer such as a personal computer. The building components are, e.g., a CPU, RAM, ROM, hard disk, external storage device, network interface, display, keyboard, and mouse. These building components are implemented by operating various building components of the spectral color reproduction apparatus 1 by hardware, software, or both.

<Flow of Overall Processing>

Figure 2:
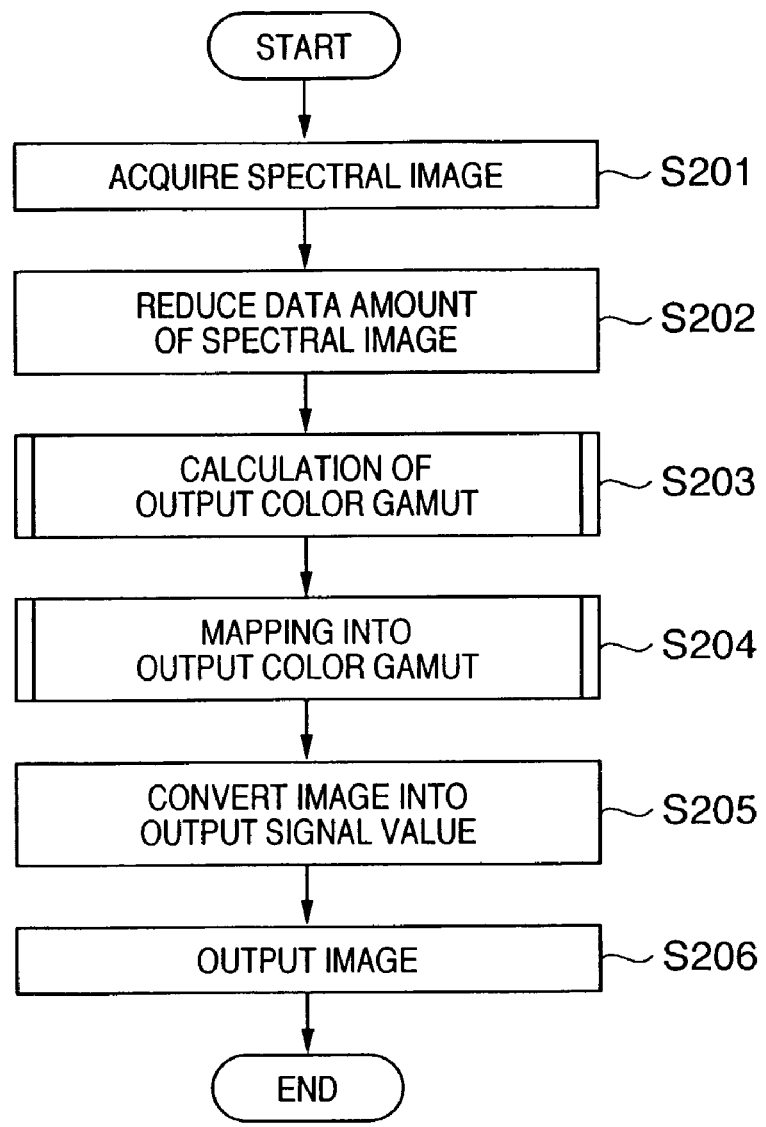
FIG. 2 is a flowchart showing overall processing executed by the spectral color reproduction apparatus according to the first embodiment of the present invention.

FIG. 2 is a flowchart showing overall processing executed by the spectral color reproduction apparatus according to the first embodiment of the present invention.

In step S201, spectral image data is input to the spectral color reproduction apparatus 1 via the input unit 3 from one of the image input device 11, external storage device 13, and external network 16, and is stored in the image buffer 4. In step S202, data amount reduction processing (details of which will be described later) of the spectral image stored in the image buffer 4 is executed by the data amount reduction processing unit 7 using a principal component vector (details of which will be described later) stored in the principal component vector storage unit 5. The processing result is stored in the image buffer 4.

In step S203, output color gamut data of the image output device 14 is calculated and stored in the output color gamut storage unit 6 (details of which will be described later). In step S204, a color outside the color gamut in the image data stored in the image buffer 4 is mapped into the color gamut by the mapping processing unit 9 using the output color gamut data stored in the output color gamut storage unit 6 (details of which will be described later). The mapping result is stored in the image buffer 4.

In step S205, the image data stored in the image buffer 4 is converted into an output signal value by the color conversion processing unit 10, and the conversion result is stored in the image buffer 4. In step S206, the image data after color conversion processing that is stored in the image buffer 4 is output from the output unit 2 using the image output device 14.

<Principal Component Vector>

A principal component vector stored in the principal component vector storage unit 5 will be explained in detail.

The principal component vector stored in the principal component vector storage unit 5 is calculated by performing principal component analysis for given spectral reflection factor data. Conceivable examples of spectral reflection factor data subjected to principal component analysis are a color chart (e.g., Macbeth color checker), input spectral image data, and a patch output from an output device. However, the spectral reflection factor data is not limited to them, and any spectral reflection factor data can be used in accordance with the application purpose.

Figure 3:
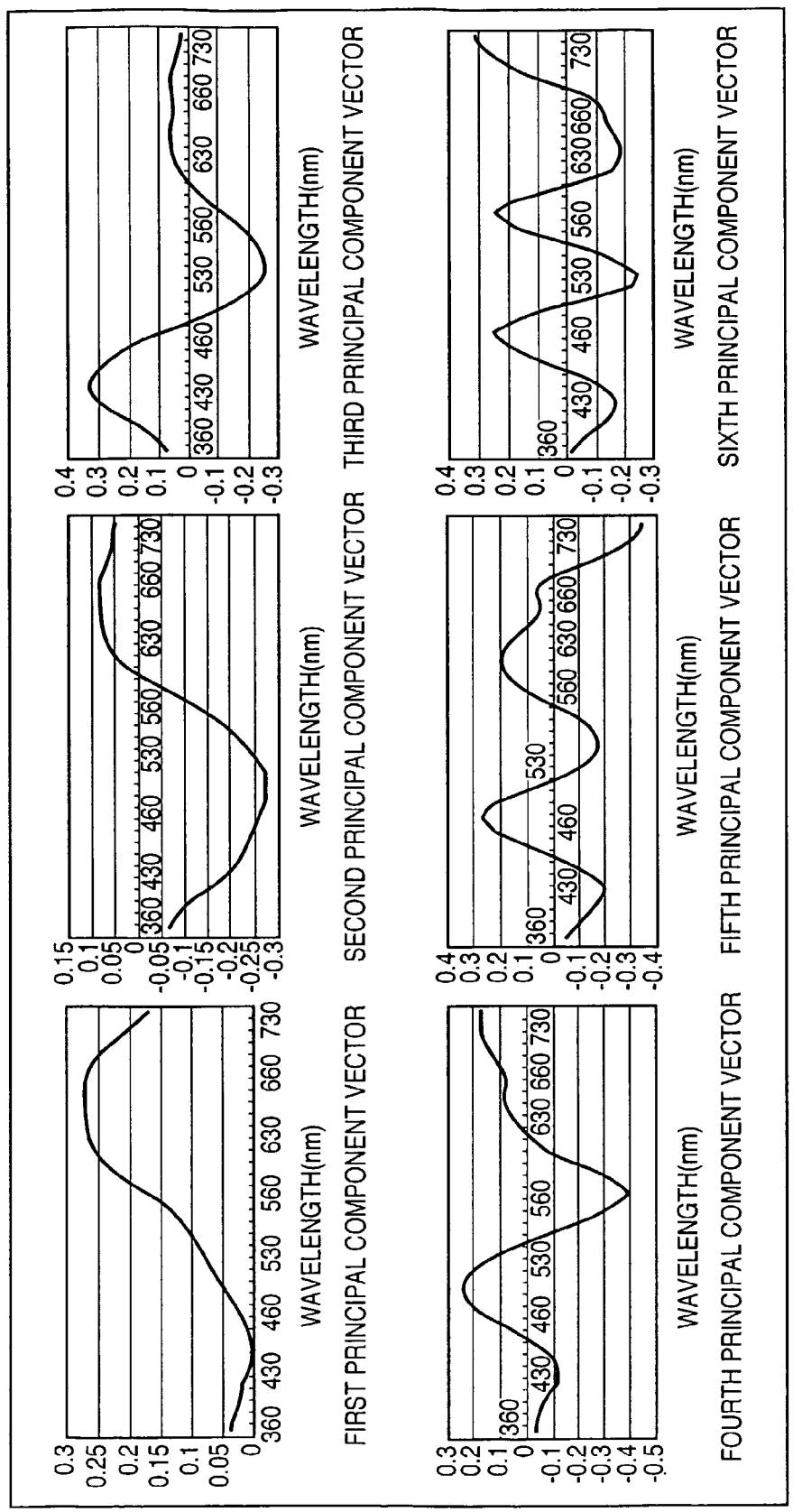
FIG. 3 is a graph showing an example of the first to sixth principal component vectors to the spectral reflection factor of 24 colors of a Macbeth color checker according to the first embodiment of the present invention.

In the first embodiment, principal component analysis is done for spectral reflection factor data of 24 colors of the Macbeth color checker, and the analysis result is stored in the principal component vector storage unit 5. FIG. 3 shows the first to sixth principal component vectors among principal component vectors calculated by principal component analysis in the first embodiment.

<Data Amount Reduction Processing>

Data amount reduction processing in step S202 will be explained in detail.

Figure 4:
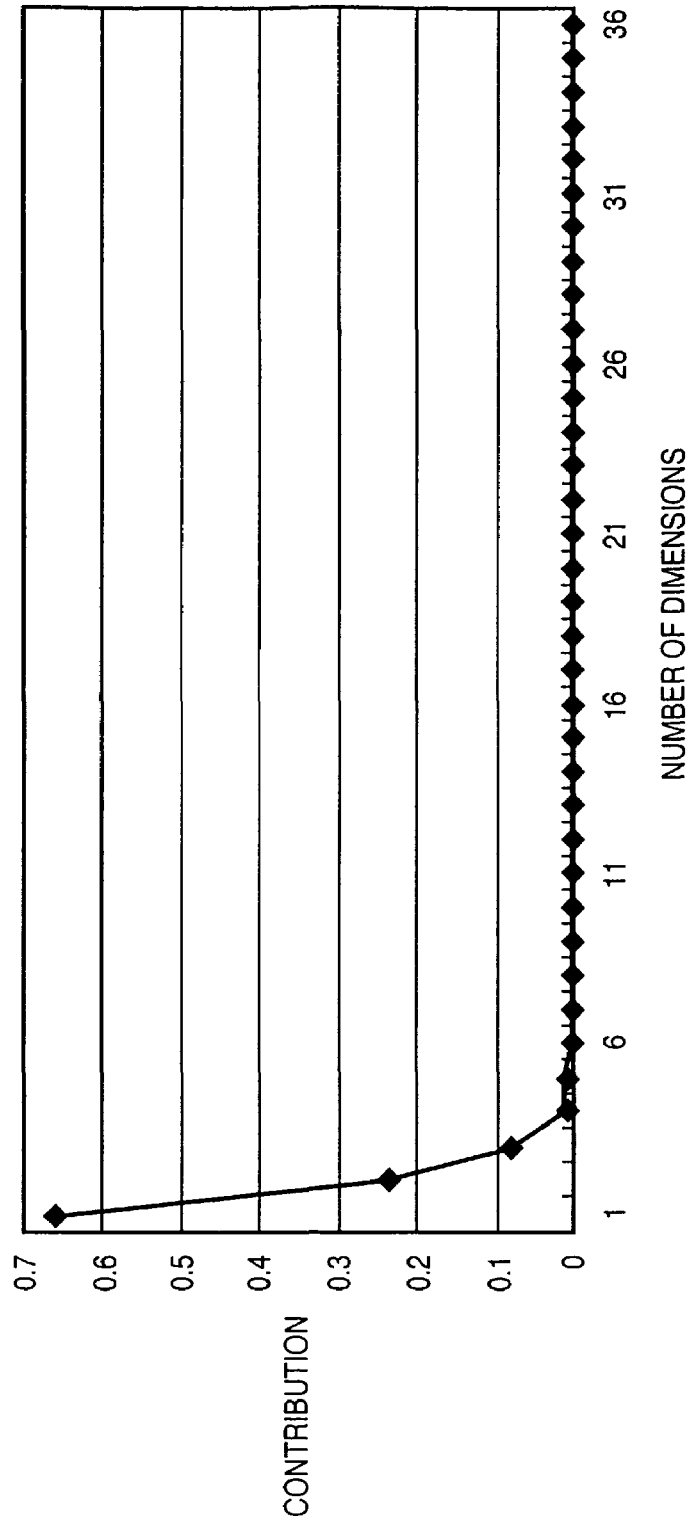
FIG. 4 is a graph showing the relationship between the number of dimensions and the contribution of a principal component according to the first embodiment of the present invention.

Letting $v_i[v_{380,i}\ v_{390,i}\ \ldots\ v_{730,\ i}]^T$ (i=1 to n) be the ith principal component vector stored in the principal component vector storage unit 5, the spectral reflection factor $o=[o_{380}\ o_{390}\ \ldots\ o_{730}]^T$ is given using a principal component coefficient (addition ratio, i.e., principal component data of the principal component vector) $a_i$ (i=1 to n)):

$$o = \sum_{i=1}^{n} a_i v_i + m \tag{1}$$

where T is the transpose, $m=[m_{380}\ m_{390}\ \ldots\ m_{730}]^T$ is the average spectral reflection factor of target spectral reflection factor data, and n is the number of dimensions used which is equal to the number of dimensions of an input. FIG. 4 shows the relationship between the number of dimensions and the contribution when principal component analysis is executed for spectral reflection factor data of 24 colors of the Macbeth color chart.

The contribution is a ratio representing the amount of information of a principal component vector calculated by principal component analysis with respect to spectral reflection factor data. As shown in FIG. 4, the contribution of the first principal component is the highest, and the contribution decreases as the principal component shifts to the second one, third one, and the like. Hence, even when only principal component vectors of dimensions smaller than the number n of dimensions of an input are used, the spectral reflection factor of an input can be approximated at high precision without excessively losing the information amount. As shown in FIG. 4, the contributions of principal components subsequent to a predetermined principal component (in FIG. 4, the seventh principal component) are almost 0. By using principal components up to the sixth principal component, the spectral reflection factors of 24 colors of the Macbeth color chart can be satisfactorily. reproduced.

A method of calculating a principal component coefficient (principal component data) $a_i$ will be explained in detail.

For example, assume that the spectral reflection factor of an input is approximated using principal components up to the sixth principal component. At this time, equation (1) can be expressed using a matrix:

$$\begin{bmatrix} o_{380} \\ o_{390} \\ \vdots \\ o_{730} \end{bmatrix} = \begin{bmatrix} v_{380,1} & v_{380,2} & \cdots & v_{380,6} \\ v_{390,1} & v_{390,2} & \cdots & v_{390,6} \\ \vdots & \vdots & \ddots & \vdots \\ v_{730,1} & v_{730,2} & \cdots & v_{730,6} \end{bmatrix} \begin{bmatrix} a_1 \\ a_2 \\ \vdots \\ a_6 \end{bmatrix} + \begin{bmatrix} m_1 \\ m_2 \\ \vdots \\ m_6 \end{bmatrix} \quad (2)$$

$$o = [o_{380} \; o_{390} \; \cdots \; o_{730}]^T$$

$$a = [a_1 \; a_2 \; \cdots \; a_6]^T$$

$$v = \begin{bmatrix} v_{380,1} & v_{380,2} & \cdots & v_{380,6} \\ v_{390,1} & v_{390,2} & \cdots & v_{390,6} \\ \vdots & \vdots & \ddots & \vdots \\ v_{730,1} & v_{730,2} & \cdots & v_{730,6} \end{bmatrix}$$

From equation (2), $$o = Va + m \quad (3)$$

The principal component coefficient a can be calculated using a pseudo inverse matrix:

$$a = (V^T V)^{-1} V^T (o - m) \quad (4)$$

Accordingly, the principal component coefficient $a = [a_1, a_2, \ldots, a_6]^T$ can be calculated. By using the principal component coefficient a, the spectral reflection factor o formed from data of 36 dimensions can be approximated by six dimensions.

Although the first embodiment has exemplified principal component vectors of six dimensions, the principal component coefficient a can be calculated by the same processing in an arbitrary number of dimensions.

<Output Color Gamut Calculation>

Output color gamut calculation in step S203 will be explained in detail with reference to the accompanying drawings.

Figure 5:
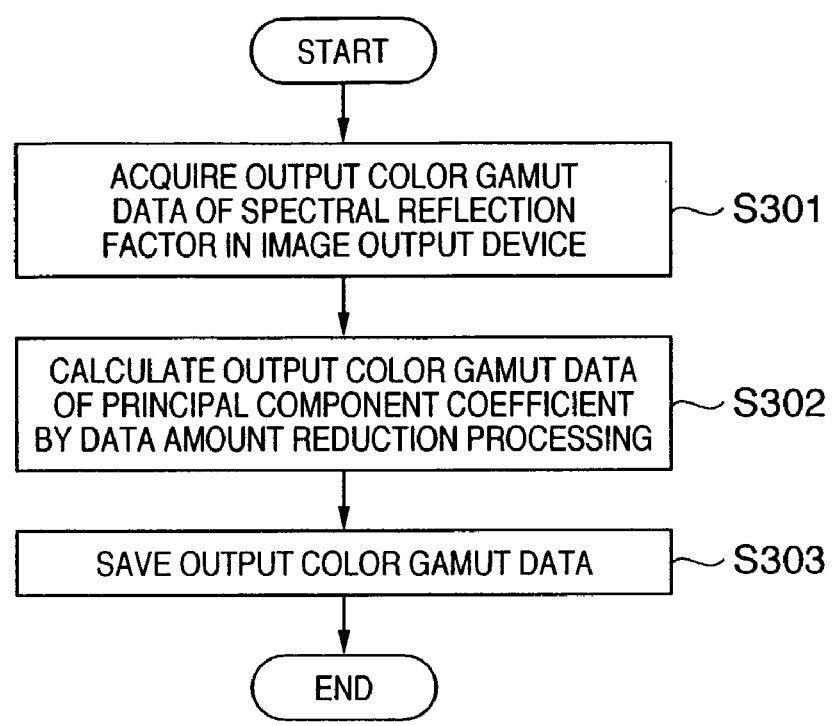
FIG. 5 is a flowchart showing details of processing in step S203 according to the first embodiment of the present invention.

FIG. 5 is a flowchart showing details of processing in step S203 according to the first embodiment of the present invention.

In step S301, output color gamut data in spectral reflection factor data of the image output device 14 is acquired (details of which will be described later). In step S302, the above-described data amount reduction processing is executed by the data amount reduction unit 7 for the output color gamut data in the spectral reflection factor data that is acquired in step S301, and output color gamut data in a principal component coefficient is calculated. In step S303, the output color gamut data in the principal component coefficient that is calculated in step S302 is stored in the output color gamut storage unit 6.

Output color gamut data in the spectral reflection factor data of the image output device 14 that is acquired in step S301 will be described in detail.

For example, the image output device 14 is an inkjet printer equipped with inks of six colors: cyan (C), magenta (M), yellow (Y), black (K), red (R), and green (G). Assume that the image output device 14 can output 256 levels of 0, 1, ..., 255 as intensities of output signals. In this case, the number of expressible colors is 256×256×256×256×256×256≈ about 28 trillion colors. In practice, the amount of ink that can land on the paper surface is limited, and not all the 28 trillion colors can be expressed.

However, it is not practical to output and measure spectral reflection factor data for all these colors. For this reason, according to the first embodiment, C, M, Y, K, R, and G output signal values (device data) each are grouped into five levels of 0, 64, 128, 192, and 255. Then, output color patches of 5×5×5×5×5×5=15,625 colors are output using the image output device 14, and spectral reflection factor data are acquired using the spectral reflection measuring device 12.

As shown in FIG. 6, C, M, Y, K, R, and G output signal values and principal component coefficient values (addition ratio of principal component vectors) are made to correspond to each other, and are stored as an LUT serving as a conversion table in the LUT storage unit 4. At this time, principal components of six dimensions are used for the six inks, and a 6×6 LUT can be created as a conversion table which converts a principal component coefficient value into an output signal value.

It can be determined from the LUT whether given principal component data (principal component coefficient value) falls within the color reproduction range of the device.

The LUT is looked up to calculate device data from principal component data. When the calculated device data falls outside a proper range, it can be determined that the principal component data falls outside the color reproduction range of the device. For example, in the case of the conversion table in FIG. 6, when calculated device data falls outside a range of 0 to 255, it can be determined that the principal component data falls outside the color reproduction range.

Note that output color gamut data is calculated in the first embodiment, but the present invention is not limited to this. For example, output color gamut data calculated in advance may be loaded.

<Mapping Processing>

Mapping processing into the output color gamut in step S204 will be explained in detail with reference to the accompanying drawings.

Figure 7:
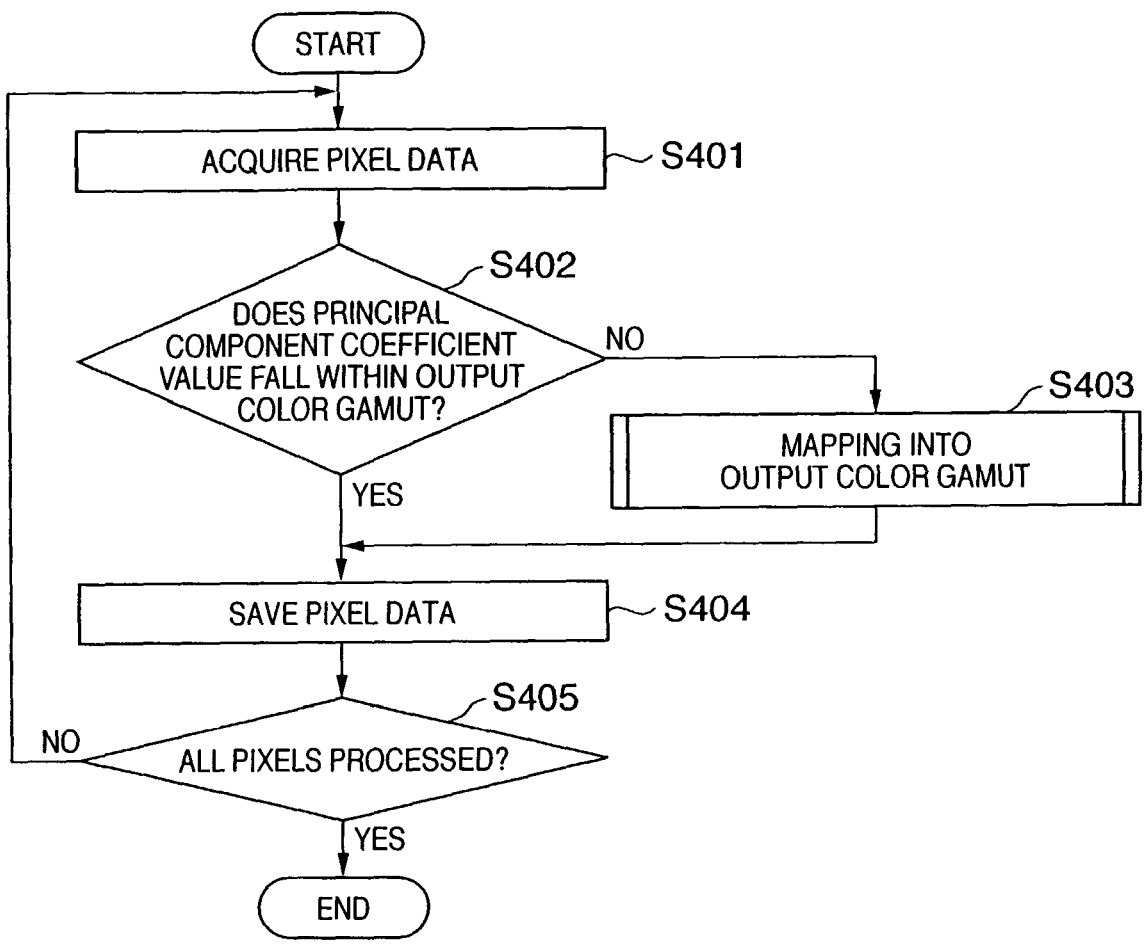
FIG. 7 is a flowchart showing details of processing in step S204 according to the first embodiment of the present invention.

FIG. 7 is a flowchart showing details of processing in step S204 according to the first embodiment of the present invention.

In step S401, the principal component coefficient value is acquired as pixel data from image data which is calculated in step S202 and stored in the image buffer 4. In step S402, it is determined whether the principal component coefficient value acquired in step S401 falls within the output color gamut stored in the output color gamut storage unit 6.

If the principal component coefficient value falls within the output color gamut (YES in step S402), the flow advances to step S404; if the principal component coefficient value falls outside the output color gamut (NO in step S402), to step S403. By a method to be described later, the color outside the output color gamut is mapped in the output color gamut.

In step S404, the processed image data is stored in the image buffer 4. In step S405, it is determined whether all pixels have been processed. If all pixels have been processed (YES in step S405), the processing ends; if all pixels have not been processed (NO in step S405), the flow returns to step S401 to perform the same processing for an unprocessed pixel.

Mapping processing into the output color gamut in step S403 will be described in detail.

Figure 8:
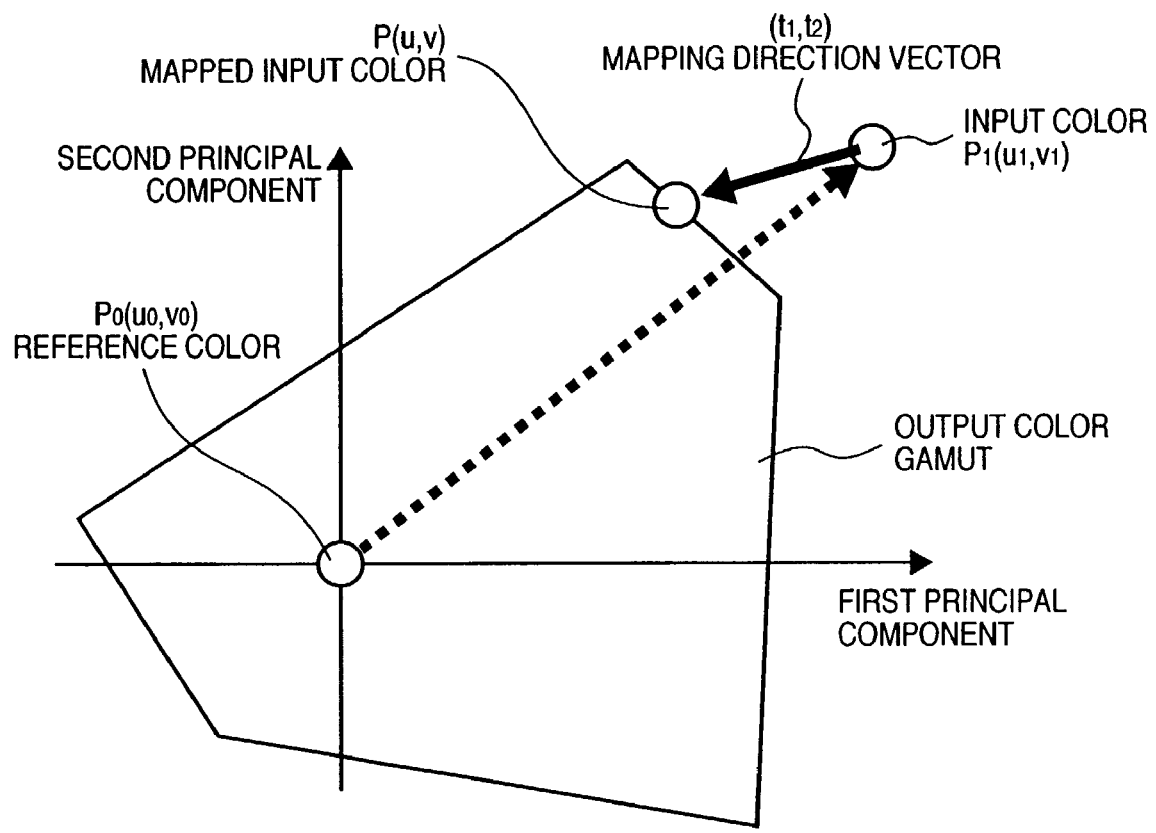
FIG. 8 is a graph for explaining the concept of mapping processing according to the first embodiment of the present invention.

As mapping of a color outside the output color gamut into the output color gamut, FIG. 8 shows an outline of mapping in the two-dimensional principal component coefficient space of the first and second principal components for descriptive convenience.

As shown in FIG. 8, an input color $P_1(u_1,v_1)$ outside the output color gamut must be mapped to a spectrally closest color $P(u,v)$ among colors in the output color gamut. For the input color $P_1(u_1,v_1)$, a reference color $P_0(u_0,v_0)$ (details of which will be described later), and the mapping direction vector $o=(t_1,t_2)$ (details of which will be described later), $p(u,v)$ is calculated by $$P(u,v) = \overrightarrow{P_0 P_1} + s \cdot \vec{o} \quad (5)$$

where $\vec{o}$ is the vector, and s is a coefficient calculated by calculating the intersection with an outer layer in the principal component coefficient space.

<Reference Color>

In the first embodiment, the reference color in equation (5) is the average value of the output color gamut. That is, a principal component coefficient calculated by executing data amount reduction in equation (4) for the average value of spectral reflection factor data of the output color gamut is defined as the reference color $P_0(u_0,v_0)$. However, the reference color is not limited to this, and data whose spectral reflection factor is 0.5 in the visible light region may be defined as the reference color. In other words, the reference color can be arbitrarily determined in accordance with the application purpose.

<Mapping Direction Vector>

The mapping direction vector $o=(t_1,t_2)$ in equation (5) will be described in detail.

As described above, a principal component of a lower-numbered dimension has a larger information amount in the principal component coefficient space. Hence, when data is mapped in the output color gamut, the information amount of a principal component of a lower-numbered dimension must be preferentially saved. For this purpose, the relationship (weight function data) between a contribution k and a weight w is defined by equation (6), and the mapping direction vector $o=(t_1,t_2)$ in equation (5) is determined by relation (7). The mapping direction vector is a vector which is set using, as a weight, the contribution of the principal component vector of spectral reflection factor data serving as an input signal.

Figure 9:
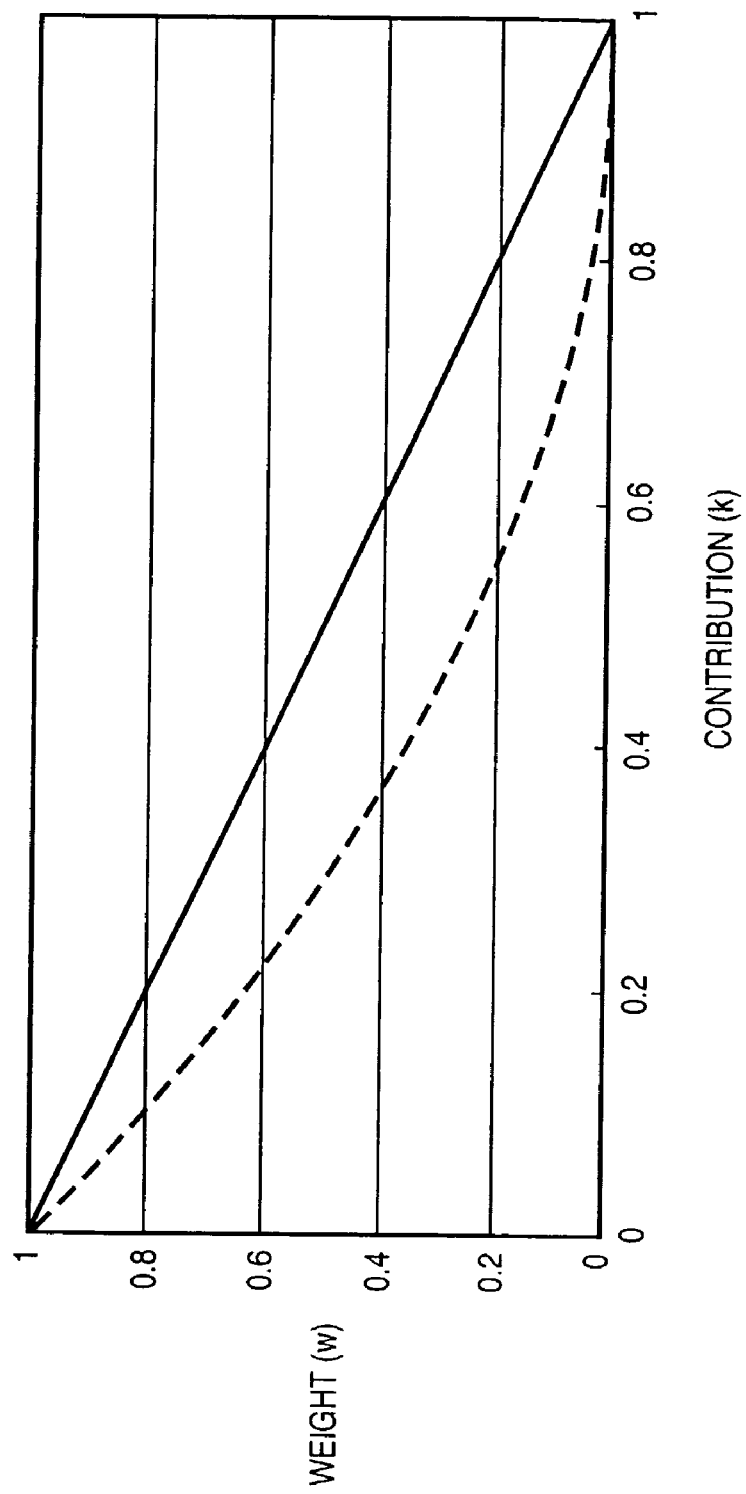
FIG. 9 is a graph showing the relationship between the contribution and the weight for determining a direction vector according to the first embodiment of the present invention.

Note that f(k) in the first embodiment may be a linear function as represented by a solid line in FIG. 9 or a nonlinear function as represented by a broken line in FIG. 9. The function f(k) is not particularly limited as far as it is a monotone decreasing function.

$$w_i = f(k_i) \quad (6)$$

$$\begin{cases} t_1 = w_1 / |u_{max} - u_{min}| \\ t_2 = w_2 / |v_{max} - v_{min}| \end{cases} \quad (7)$$

where $u_{max}$, $u_{min}$, $v_{max}$, and $v_{min}$ are the maximum and minimum values of the first principal component of spectral reflection factor data and those of the second principal component, respectively, and $w_1$ and $w_2$ are weights corresponding to the contributions $k_1$ and $k_2$ of the first and second principal components, respectively.

Mapping processing has been described using the two-dimensional principal component coefficient space of the first and second principal components for descriptive convenience. If the above-described method is expanded to the number of dimensions of principal components used, mapping processing can be done in a multi-dimensional principal component coefficient space.

In the first embodiment, mapping is done using the first and second principal component data for descriptive convenience. However, the first to sixth principal component data can also be used.

<Effects of First Embodiment>

As described above, according to the first embodiment, even if the spectral reflection factor of an input falls outside the color gamut of an output device, high-speed processing by geometric calculation of a multi-dimensional space can be achieved by the spectral color reproduction technique of reproducing the spectral reflection factor of an input by using the output device. Mapping processing into the output color gamut can be executed while the reproduction precision of the spectral reflection factor is maintained as much as possible.

Second Embodiment

An outline of a spectral color reproduction apparatus according to the second embodiment of the present invention will be described.

In the second embodiment, the principal component vector, output color gamut data, the reference color, and f(k) in equation (6) in the first embodiment are determined using a user interface (operation screen). Processing can be executed while an image after mapping processing and a quantitative value are confirmed on the user interface.

An example of the configuration of the spectral color reproduction apparatus according to the second embodiment of the present invention will be explained in detail with reference to the accompanying drawings.

Figure 10:
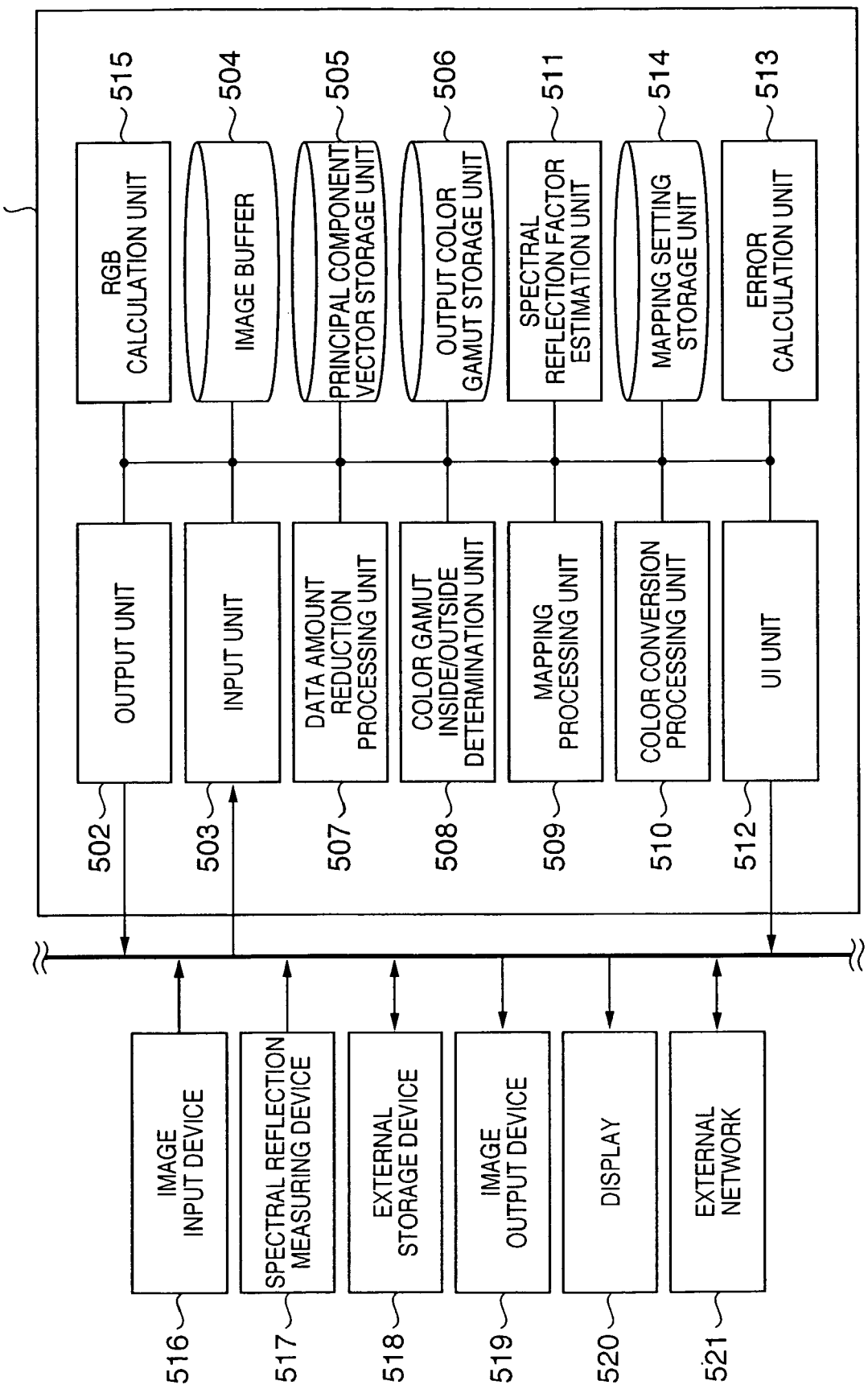
FIG. 10 is a block diagram showing a spectral color reproduction apparatus according to the second embodiment of the present invention.

FIG. 10 is a block diagram showing the configuration of a system having the spectral color reproduction apparatus according to the second embodiment of the present invention.

Reference numeral 501 denotes a spectral color reproduction apparatus according to the second embodiment. Reference numeral 502 denotes an output unit which outputs processed image data and RGB image data. Reference numeral 503 denotes an input unit which receives spectral data and spectral image data. Reference numeral 504 denotes an image buffer which stores input image data and image data during processing.

Reference numeral 505 denotes a principal component vector storage unit which stores principal component vector data. Reference numeral 506 denotes an output color gamut storage unit which stores output color gamut data of an output device (e.g., an image output device 519 or display 520). Reference numeral 507 denotes a data amount reduction processing unit which reduces the data amount of spectral image data stored in the image buffer 504 by using a principal component vector stored in the principal component vector storage unit 505.

Reference numeral 508 denotes a color gamut inside/outside determination unit which determines whether each pixel of image data which is stored in the image buffer 504 and whose data amount is reduced falls inside or outside the output color gamut stored in the output color gamut storage unit 506. Reference numeral 509 denotes a mapping processing unit which maps a color outside the output color gamut into the output color gamut. Reference numeral 510 denotes a color conversion processing unit which converts, into an output signal value, each pixel of image data that is stored in the image buffer 504 and has undergone mapping processing.

Reference numeral 511 denotes a spectral reflection factor estimation unit which estimates a spectral image from image data that is stored in the image buffer 504 and has undergone mapping processing. Reference numeral 512 denotes a UI (User Interface) unit which displays a user interface. Reference numeral 513 denotes an error calculation unit which calculates an error between an output image and an input image stored in the image buffer 504. Reference numeral 514 denotes a mapping setting storage unit which stores mapping setting information set via the UI unit 512. Reference numeral 515 denotes an RGB calculation unit which converts a spectral reflection factor into device RGB data.

Reference numeral 516 denotes an image input device such as a multi-band camera. Reference numeral 517 denotes a spectral reflection measuring device. Reference numeral 518 denotes an external storage device which is implemented by a hard disk, CD-ROM, DVD-ROM, or the like. The image output device 519 is, e.g., a printer. The display 520 is, e.g., a CRT or LCD. Reference numeral 521 denotes an external network.

Figure 11:
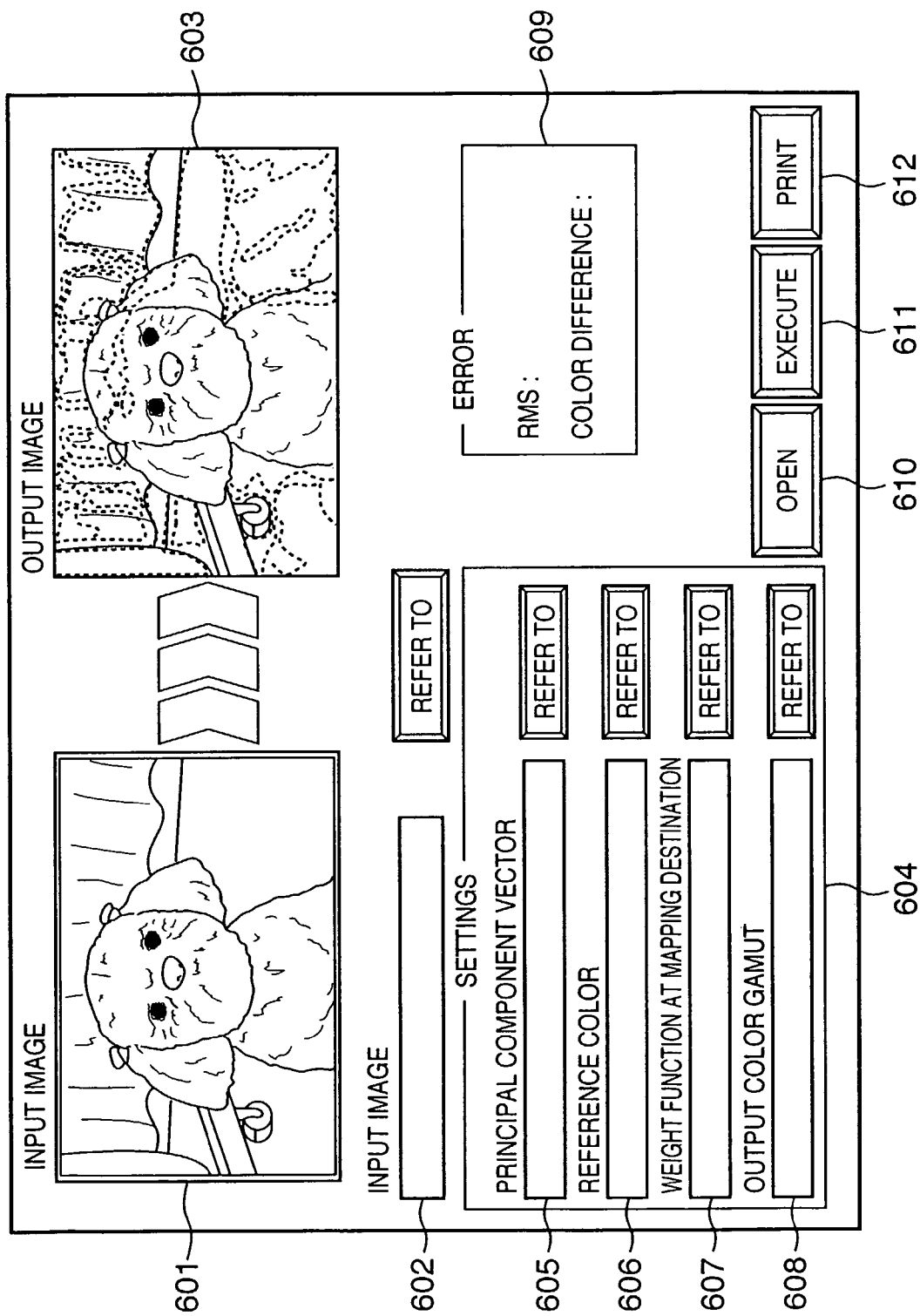
FIG. 11 is a view showing an example of the user interface of the spectral color reproduction apparatus according to the second embodiment of the present invention.

FIG. 11 shows an example of a user interface according to the second embodiment of the present invention.

Reference numeral 601 denotes an input image display portion which displays an input image. Reference numeral 602 denotes an input edit box which inputs a path to the input destination of an input image. Reference numeral 603 denotes an output image display portion which displays a processed image. Reference numeral 604 denotes a setting portion which is made up of various control fields for making settings of mapping processing.

Reference numeral 605 denotes a principal component vector edit box which is a control field for inputting a path where principal component vector data is stored. Reference numeral 606 denotes a reference color edit box which is a control field for inputting a path where reference color data is stored. Reference numeral 607 denotes an edit box for a weight function at a mapping destination that is a control field for inputting a path where a weight function at a mapping destination is stored. Reference numeral 608 denotes an output color gamut edit box which is a control field for inputting a path where output color gamut data is stored.

Reference numeral 609 denotes an error display portion which displays an error. Reference numeral 610 denotes an input button for inputting an image. Reference numeral 611 denotes an execution button for executing processing. Reference numeral 612 denotes a print button for printing an output image.

The user interface is displayed by the UI unit 512 on the display 520. The arrangement of the user interface is merely an example. Control fields (e.g., pull-down menu, list box, radio button, and check box) other than those shown in FIG. 11 can also be provided as far as various data for implementing processing according to the present invention can be input.

<Flow of Overall Processing>

Figure 12:
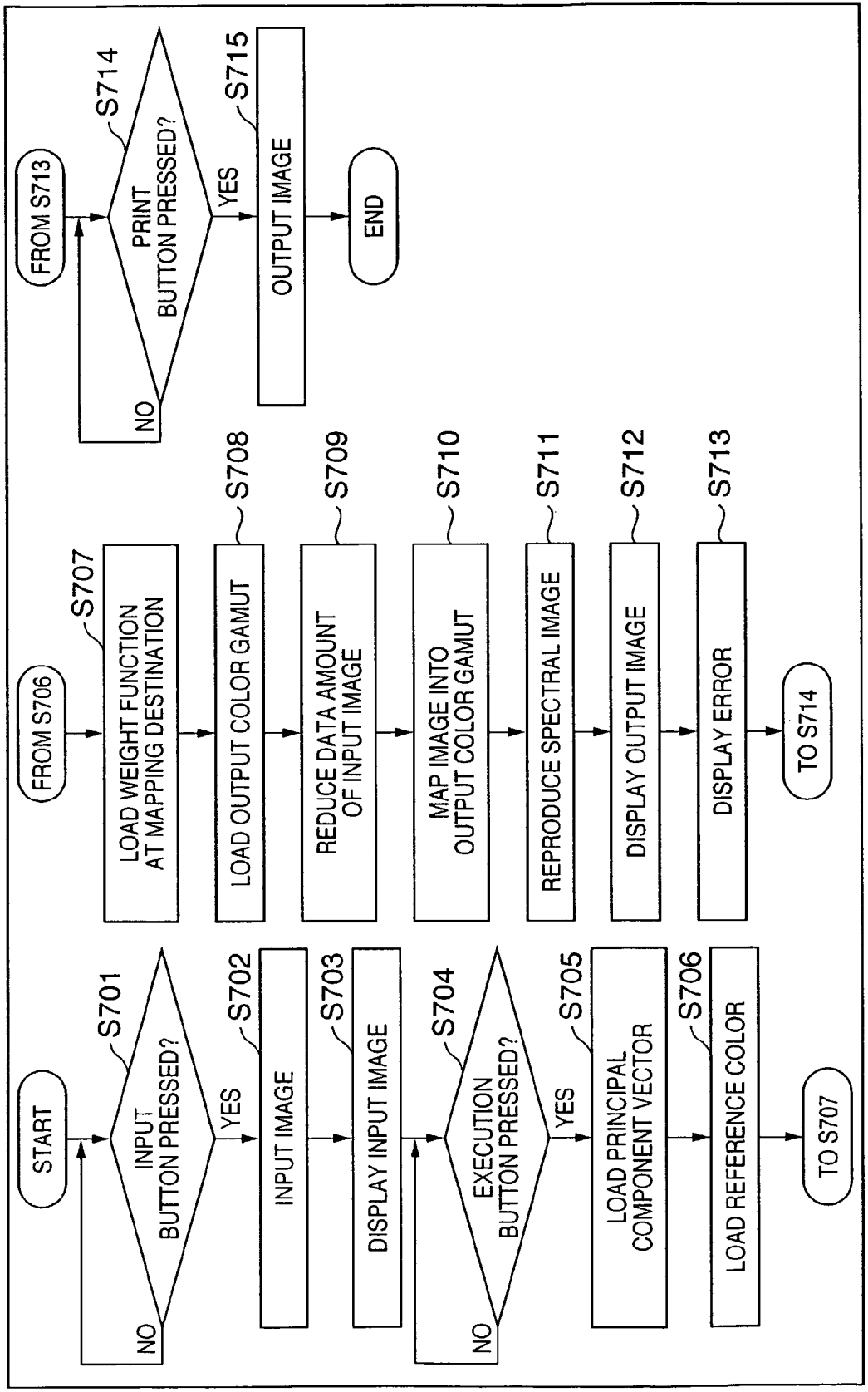
FIG. 12 is a flowchart showing overall processing executed by the spectral color reproduction apparatus according to the second embodiment of the present invention.
Figure 13:
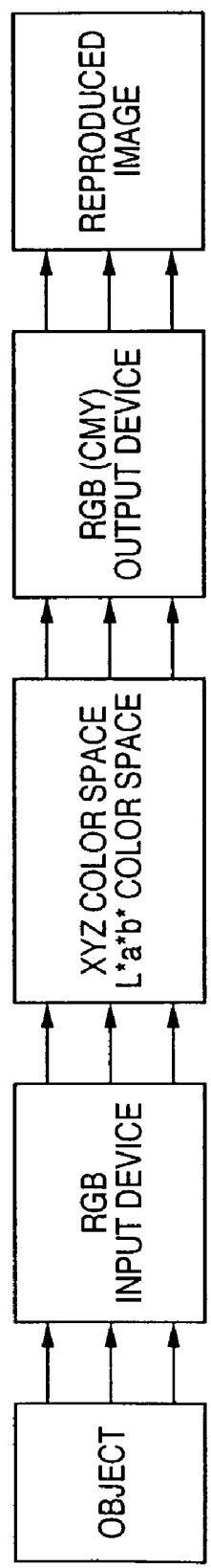
FIG. 13 is a conceptual view showing the flow of colorimetric color reproduction.
Figure 14:
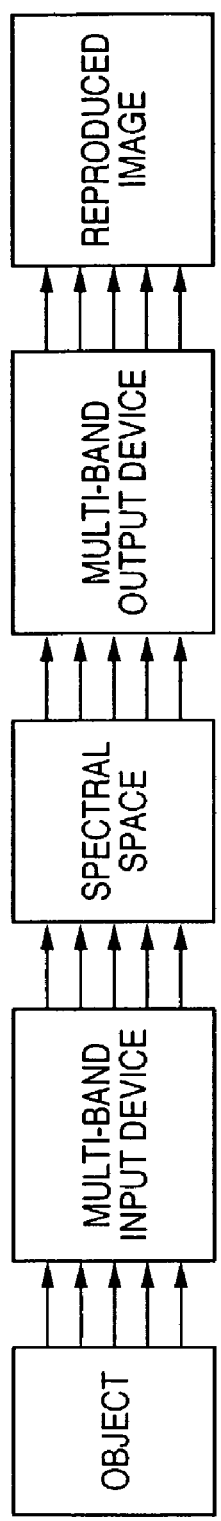
FIG. 14 is a conceptual view showing the flow of spectral color reproduction.

FIG. 12 is a flowchart showing overall processing executed by the spectral color reproduction apparatus according to the second embodiment of the present invention.

In step S701, it is determined whether the input button 610 is pressed. If the input button 610 is not pressed (NO in step S701), the flow waits until it is pressed; if the input button 610 is pressed (YES in step S701), advances to step S702.

In step S702, a spectral image stored in a path input to the input edit box 602 is input to the input unit 503, and stored in the image buffer 504. In step S703, the spectral image input in step S702 is converted into device RGB data by the RGB calculation unit 515, and displayed on the input image display portion 601 by the output unit 502.

In step S704, it is determined whether the execution button 611 is pressed. If the execution button 611 is not pressed (NO in step S704), the flow waits until it is pressed; if the execution button 611 is pressed (YES in step S704), advances to step S705.

In step S705, principal component vector data stored in a path input to the principal component vector edit box 605 is stored in the principal component vector storage unit 505. In step S706, reference color data stored in a path input to the reference color edit box 606 is stored in the mapping setting storage unit 514.

In step S707, weight function data at a mapping destination stored in a path input to the mapping destination weight function edit box 607 is stored in the mapping setting storage unit 514. In step S708, output color gamut data stored in a path input to the output color gamut edit box 608 is stored in the output color gamut storage unit 506. In step S709, similar to the first embodiment, the data amount of image data stored in the image buffer 504 is reduced by the data amount reduction processing unit 507 using the principal component vector data stored in the principal component vector storage unit 505. The resultant image data is stored in the image buffer 504.

In step S710, similar to the first embodiment, the image data stored in the image buffer 504 is mapped by the mapping processing unit 509 using the output color gamut data stored in the output color gamut storage unit 506, and the resultant image data is stored in the image buffer 504. In step S711, the spectral reflection factor is estimated by the spectral reflection factor estimation unit 511 from output image data stored in the image buffer 504, and stored in the image buffer 504. Note that the spectral reflection factor can be estimated using equation (3).

In step S712, the output spectral image data stored in step S711 is converted into device RGB data by the RGB calculation unit 515, and displayed on the output image display portion 603 by the output unit 502. At this time, the output image display portion 603 displays a mark in a pixel area where mapping processing has been done. In step S713, an error between the input image stored in the image buffer 504, and output spectral image data stored in step S711 is calculated (details of which will be described later). The error is displayed on the error display portion 609 by the output unit 502.

In step S714, it is determined whether the print button 612 is pressed. If the print button 612 is not pressed (NO in step S714), the flow waits until it is pressed; if the print button 612 is pressed (YES in step S714), advances to step S715.

In step S715, the output image data which is stored in the image buffer 504 and has undergone mapping processing is converted into an output signal by the color conversion processing unit 510. The image is output from the output unit 502 using the image output device 519.

<Error Display>

Display of an error in step S713 will be explained in detail.

An error is desirably calculated in an area where mapping processing is done out of an input image and a processed output image. The error may be the average RMS error (Root Mean Square Err) of the spectral reflection factor of an input and a spectral reflection factor estimated by the spectral reflection factor estimation unit 511, or the average color difference.

The color difference may be calculated using $\Delta E$, $\Delta E94$, $\Delta E2000$, or the like, and the illumination light source may be the CIE standard auxiliary light source D65 or the CIE standard light source A. In other words, any light source can be adopted.

In the second embodiment, the error may be displayed by simultaneously displaying the average RMS and average color difference, as shown in FIG. 11, or displaying only the average RMS or average color difference. Alternatively, an error of a pixel area designated with the mouse pointer on the output image display portion 603 may be displayed.

<Effects of Second Embodiment>

As described above, according to the second embodiment, an arbitrary principal component vector, arbitrary reference color, a weight function at an arbitrary mapping destination, an output color gamut, and the like are set using the user interface by the spectral color reproduction technique of reproducing the spectral reflection factor of an input by using the output device. Even if the spectral reflection factor of an input falls outside the color gamut of the output device, mapping processing can be achieved. Processing can be done while a mapped image and quantitative value are confirmed.

Other Embodiment

<Sampling Interval>

The sampling interval of the spectral reflection factor is set to 10 nm in the above embodiments, but is not limited to this. For example, the sampling interval may be set to 5 nm or 1 nm. Any sampling interval can be employed as far as a desired precision is satisfied. The sampling range is set to a visible light region of 380 to 730 nm in the above embodiments, but is not limited to this.

<Number of Output Signals>

Printing materials used by the printer serving as an image output device are six, C, M, Y, K, R, and G color inks (or toners) in the above embodiments, but are not limited to them. For example, a larger number of inks may be used, or four, C, M, Y, and K color inks (toners) may be used. R, G, and B signal values for a display and projector may also be exploited.

<Data Amount Reduction>

In the above embodiments, the data amount is reduced using principal components of up to six dimensions in order to make the principal components correspond to the six, C, M, Y, K, R, and G color inks, but the present invention is not limited to this. For example, the six color inks and principal component coefficients of up to three dimensions may be employed. The relationship between the number of dimensions of an input and that of an output is arbitrary unless the number of dimensions of an input exceeds that of an output. When the number of dimensions of an input is different from that of an output, a plurality of correspondences between an input and an output may exist. However, the configuration is not particularly limited as far as the correspondence is uniquely determined using a spectral characteristic, color difference, graininess, tonality, and the like as evaluation values.

<Input Data>

The above embodiments use spectral image data as input data, but the input data is not limited to this. For example, the input data may be spectral reflection factor data measured by the spectral reflection measuring device. Alternatively, spectral reflection factor data may be calculated from a spectral radiance measured by a spectral radiance measuring device.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2005-115909 filed on Apr. 13, 2005, which is hereby incorporated by reference herein its entirety.

The invention claimed is:

1. A color processing method comprising:
   using input means for inputting principal component data of a plurality of dimensions representing colors; and
   using change means for changing principal component data of each of the plurality of dimensions by using a weight corresponding to a contribution of the principal component data of each dimension so as to map, in a color reproduction range of a device, the colors represented by the input principal component data of the plurality of dimensions,
   wherein the weight of the principal component data of each dimension decreases as the contribution decreases.

2. The method according to claim 1, further comprising:
   holding a conversion table representing correspondences between the principal component data of the plurality of dimensions and device data; and
   determining, using the conversion table, whether the principal component data of the plurality of dimensions fall within the color reproduction range of the device.

3. The method according to claim 1, further comprising:
   inputting spectral reflection factors of a plurality of colors; and
   performing principal component analysis for the spectral reflection factors of the plurality of colors to obtain principal component vectors and contributions,
   wherein the principal component data of the plurality of dimensions are generated from the spectral reflection factors representing colors on the basis of the principal component vectors.

4. The method according to claim 1, wherein the weight of the principal component data of each of the plurality of dimensions corresponds to a maximum value and minimum value of the principal component data of each dimension.

5. The method according to claim 1, further comprising:
   obtaining a first spectral reflection factor from mapped principal component data of the plurality of dimensions; and
   displaying an error between the first spectral reflection factor and a second spectral reflection factor corresponding to the input principal component data of the plurality of dimensions.

6. A program, embodied on a computer readable medium, which controls a color processing apparatus to execute a color processing method defined in claim 1.

7. A color processing apparatus comprising:
   input means for inputting principal component data of a plurality of dimensions representing colors; and
   change means for changing principal component data of each of the plurality of dimensions by using a weight corresponding to a contribution of the principal component data of each dimension so as to map, in a color reproduction range of a device, the colors represented by the input principal component data of the plurality of dimensions,
   wherein the weight of the principal component data of each dimension decreases as the contribution decreases.

* * * * *